(12) United States Patent
Stawski et al.

(10) Patent No.: US 10,736,333 B2
(45) Date of Patent: Aug. 11, 2020

(54) GELLED CONFECTION WITH REDUCED SUGAR

(71) Applicant: WM. WRIGLEY JR. COMPANY, Chicago, IL (US)

(72) Inventors: Barbara Z. Stawski, Forest Park, IL (US); Chia-Hua Hsu, Glenview, IL (US); David G. Barkalow, Deerfield, IL (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 147 days.

(21) Appl. No.: 14/370,261

(22) PCT Filed: Jan. 9, 2013

(86) PCT No.: PCT/US2013/020723
§ 371 (c)(1),
(2) Date: Jul. 2, 2014

(87) PCT Pub. No.: WO2013/106363
PCT Pub. Date: Jul. 18, 2013

(65) Prior Publication Data
US 2015/0050411 A1 Feb. 19, 2015

Related U.S. Application Data

(60) Provisional application No. 61/584,436, filed on Jan. 9, 2012.

(51) Int. Cl.
| | | |
|---|---|---|
| *A23G 3/36* | (2006.01) | |
| *A23G 3/42* | (2006.01) | |
| *A23L 27/30* | (2016.01) | |
| *A23G 9/04* | (2006.01) | |
| *A23G 3/48* | (2006.01) | |
| *A23G 3/34* | (2006.01) | |

(52) U.S. Cl.
CPC .............. *A23G 3/36* (2013.01); *A23G 3/34* (2013.01); *A23G 3/42* (2013.01); *A23G 3/48* (2013.01); *A23G 9/04* (2013.01); *A23L 27/34* (2016.08); *A23V 2002/00* (2013.01)

(58) Field of Classification Search
CPC ... A23G 3/36; A23G 3/34; A23G 3/42; A23G 3/48; A23G 9/04; A23V 2002/00; A23L 27/34
USPC ....... 426/548, 573, 574, 575, 576, 577, 578, 426/658, 660
See application file for complete search history.

(56) References Cited

U.S. PATENT DOCUMENTS

| | | | |
|---|---|---|---|
| 4,786,722 A | 11/1988 | Zehner | |
| 4,883,685 A | 11/1989 | Kondou | |
| 4,902,525 A | 2/1990 | Kondou | |
| 5,236,719 A | 8/1993 | Meyers et al. | |
| 5,244,690 A | 9/1993 | Van der Schueren et al. | |
| 5,273,771 A | 12/1993 | Rapaille et al. | |
| 5,286,501 A | 2/1994 | Song et al. | |
| 5,314,701 A | 5/1994 | Mentick et al. | |
| 5,342,631 A | 8/1994 | Yatka et al. | |
| 5,356,644 A | 10/1994 | Hendrick et al. | |
| 5,378,481 A | 1/1995 | Minamikawa et al. | |
| 5,409,726 A | 4/1995 | Standley et al. | |
| 5,397,579 A | 5/1995 | Yatka et al. | |
| 5,425,957 A | 6/1995 | Gaim-Marsoner et al. | |
| 5,425,961 A | 6/1995 | Yatka et al. | |
| 5,431,929 A | 7/1995 | Yatka et al. | |
| 5,436,329 A | 7/1995 | Caboche | |
| 5,458,892 A | 10/1995 | Yatka et al. | |
| 5,462,760 A | 10/1995 | Serpelloni et al. | |
| 5,468,509 A | 11/1995 | Schlup et al. | |
| 5,478,593 A | 12/1995 | Serpellioni et al. | |
| 5,567,467 A | 10/1996 | Kondou et al. | |
| 5,571,547 A | 11/1996 | Serpellioni et al. | |
| 5,601,866 A | 2/1997 | Serpelloni et al. | |
| 5,629,042 A | 5/1997 | Serpelloni et al. | |
| 5,667,573 A | 9/1997 | Kondou | |
| 5,681,601 A | 10/1997 | Hendrick et al. | |
| 5,700,514 A | 12/1997 | Gonze et al. | |
| 5,795,590 A | 8/1998 | Kiefer et al. | |
| 5,916,881 A | 6/1999 | Okada et al. | |

(Continued)

FOREIGN PATENT DOCUMENTS

| | | |
|---|---|---|
| EP | 0123742 | 7/1984 |
| EP | 0377278 B1 | 7/1990 |

(Continued)

OTHER PUBLICATIONS

Casterton et al., "Evaluation of sucromalt digestion in healthy children using breath hydrogen as a biomarker of carbohydrate malabsorption," (2011 ) Food and Function, vol. 3, Is 4, p. 410-413.* foodnavigator.com "Xtend TM Sucromalt and Isomaltulose", Feb. 28, 2007, 4 pages.

U.S. Food and Drug Administration, Evaluation of the Generally Recognized as Safe (GRAS) Status of Sucromalt, Cargill, Incorporated, Sep. 8, 2008, GRN No. 258, retrieved on Mar. 18, 2015, http://www.accessdata.fda.gov/scripts/fdcc/?set=GRASNofices&id=258&sort=GRN_No&order=DESC&startfow=1&type=basic&search=sucromalt, 1 page.

International Search Report and Written Opinion for Application No. PCT/US2011/67361, dated Apr. 27, 2012, 14 pages.

(Continued)

*Primary Examiner* — Leslie A Wong

(57) ABSTRACT

A low sugar, low cariogenic, low-laxation gelled confection having acceptable texture, stability, clarity, and flavor delivery, that contains a doctoring agent comprising sucromalt, inulin, brown rice syrup, or combinations thereof; erythritol as the bulking sweetener agent; and a gelling agent comprising gelatin, pectin, starch, dextrin, hydrocolloid, milk proteins, or combinations thereof; wherein the doctoring agent to erythritol ratio is 90:10 to 70:30 wt % solids and the gelled confection has consumer acceptable texture, stability, clarity, and flavor delivery.

27 Claims, No Drawings

(56) References Cited

U.S. PATENT DOCUMENTS

| | | |
|---|---|---|
| 5,973,212 A | 10/1999 | De Sadeleer et al. |
| 5,998,177 A | 12/1999 | Catani et al. |
| 6,017,567 A | 1/2000 | Rosenplenter |
| 6,045,850 A | 4/2000 | Kondou |
| 6,083,438 A | 7/2000 | Gonze et al. |
| 6,143,345 A | 11/2000 | Gonze et al. |
| 6,177,064 B1 | 1/2001 | de Troostembergh et al. |
| 6,187,336 B1 | 2/2001 | Okumura et al. |
| 6,238,690 B1 | 5/2001 | Kiefer et al. |
| 6,264,989 B1 | 7/2001 | Kato et al. |
| 6,274,727 B1 | 8/2001 | Maul et al. |
| 6,287,596 B1 | 9/2001 | Murakami et al. |
| 6,447,821 B1 | 9/2002 | Hakamata et al. |
| 6,455,090 B1 | 9/2002 | Uzuhashi et al. |
| 6,455,096 B1 | 9/2002 | Katagiri et al. |
| 6,506,434 B1 | 1/2003 | Toub et al. |
| 6,511,679 B2 | 1/2003 | D'Amelia et al. |
| 6,620,791 B1 | 9/2003 | Cooper et al. |
| 6,743,456 B1 | 6/2004 | Ribadeau-Dumas et al. |
| 6,767,576 B2 | 7/2004 | Serpelloni |
| 6,773,744 B1 | 8/2004 | Ward et al. |
| 6,780,990 B1 | 8/2004 | Le |
| 6,783,779 B2 | 8/2004 | Rapp et al. |
| 6,875,460 B2 | 4/2005 | Cunningham et al. |
| 6,994,889 B2 | 2/2006 | Satomi et al. |
| 7,022,364 B1 | 4/2006 | De Meuter et al. |
| 7,063,858 B2 | 6/2006 | Saniez et al. |
| 7,108,886 B2 | 9/2006 | De Meuter et al. |
| 8,512,739 B2 | 8/2013 | Carlson et al. |
| 2003/0077369 A1 | 4/2003 | Jager et al. |
| 2004/0086615 A1 | 5/2004 | Johnson et al. |
| 2004/0110442 A1 | 6/2004 | Rhim et al. |
| 2006/0051480 A1 | 3/2006 | Miles |
| 2006/0172053 A1 | 8/2006 | Hahn et al. |
| 2006/0222754 A1 | 10/2006 | Singer |
| 2007/0212460 A1 | 9/2007 | Inoue et al. |
| 2007/0224323 A1 | 9/2007 | Goldman |
| 2009/0004360 A1 | 1/2009 | Bingley et al. |
| 2009/0074917 A2 | 3/2009 | Steele et al. |
| 2010/0104722 A1 | 4/2010 | Francisca et al. |
| 2010/0112142 A1 | 5/2010 | Barkalow et al. |
| 2010/0119664 A1* | 5/2010 | Stawski .................. A23G 3/42 426/103 |
| 2010/0203190 A1 | 8/2010 | Barkalow et al. |
| 2010/0267658 A1 | 10/2010 | Wach et al. |
| 2011/0091598 A1 | 4/2011 | Hsu et al. |
| 2011/0129563 A1* | 6/2011 | Ashokan ................ A23G 3/364 426/5 |
| 2011/0313055 A1 | 12/2011 | Ervin et al. |

FOREIGN PATENT DOCUMENTS

| | | |
|---|---|---|
| EP | 0676147 A1 | 10/1995 |
| EP | 0720819 A2 | 7/1996 |
| EP | 1797768 A2 | 6/2007 |
| GB | 2066639 B | 7/1981 |
| WO | WO1992002149 | 2/1992 |
| WO | WO1993012665 | 7/1993 |
| WO | 2001019203 A1 | 3/2001 |
| WO | 2001019204 A1 | 3/2001 |
| WO | 2004040991 A2 | 5/2004 |
| WO | 2008055510 A1 | 5/2008 |
| WO | 2008100851 A1 | 8/2008 |
| WO | 2008100853 A1 | 8/2008 |
| WO | 2008100854 A1 | 8/2008 |
| WO | 2008102162 A1 | 8/2008 |
| WO | 2008141333 A1 | 11/2008 |
| WO | WO2009124067 | 10/2009 |
| WO | 2010031527 A1 | 3/2010 |
| WO | 2011038882 A1 | 4/2011 |
| WO | 2011107234 A1 | 9/2011 |
| WO | 2012006215 A1 | 1/2012 |
| WO | 2012071035 A1 | 5/2012 |

OTHER PUBLICATIONS

International Search Report and Written Opinion for Application No. PCT/US2013/20723, dated May 13, 2013, 13 pages.

European Supplementary Search Report for Application No. EP 11 85 2656, dated Oct. 13, 2014, 8 pages.

European Supplementary Search Report for Application No. EP 13 73 6401, dated Sep. 8, 2016, 12 pages.

"Inulin—A Good-for-you" Fat Replacer, Texture Modifier; Food Formulating—Feb. 1997—R&D Technologies—1 page.

Cheetham, P.S.J., "Production of Isomaltulose Using Immobilized Microbial Cells," In Methods in Enzymology, 136: 432-454 (1987) Academic Press.

* cited by examiner

GELLED CONFECTION WITH REDUCED SUGAR

PRIORITY DATA

The present patent application is a 371 of International Application No. PCT/US13/20723 filed Jan. 9, 2013, which claims benefit from U.S. Ser. No. 61/584,436 filed Jan. 9, 2012. All of the patent applications listed above incorporated by reference therefrom as if fully restated herein.

BACKGROUND OF THE INVENTION

The present invention relates to an improved gelled confection, more specifically, relates to an improved gelled confection using bulking sweetener agents and doctoring agents that give acceptable texture, stability, clarity, and flavor delivery, while being less cariogenic then traditional corn syrup and sucrose gelled confections, and while not causing gastrointestinal disturbances.

Consumers like gelled confections. Gelled confections are sometimes called gummies, jellies, or gum drops. Gelled confections can be transparent, translucent, or opaque, with transparent being preferred by consumers. Gelled confections are often chewed as they have a firm, elastic texture that appeals to consumers. As gelled confections are chewed, they break apart into smaller pieces, which then dissolve in the mouth. These smaller confection pieces dissolve slowly in the mouth and deliver flavor and sweetness as they dissolve into a pleasant syrup during chewing.

Gelled confection is a food product that is formed by a) creating a saturated solution containing water, bulking sweetener agent, and doctoring agent; 2) creating a hydrated suspension containing water and gelling agent; 3) combining the saturated solution with the hydrated suspension; 4) removing water from the combination by cooking (i.e., heating); 5) cooling the confection mass; and 6) finishing the confection mass by removing additional water and forming the confection mass into individual pieces. The finishing step also contains tempering the gelled confection to room temperature.

Gelled confections may contain, but are not limited to, gelling agents, bulking sweetener agent, doctoring agent, flavors, actives, colors, sensates, and high intensity sweeteners.

Gelled confection products contain at least one gelling agent. The gelling agent includes, but is not limited to, gelatin, pectin, starch, dextrins, hydrocolloids, milk based proteins, and combinations thereof. The gelling agent creates a gel matrix throughout the confection through its loosely connected strands. The amount and length of the gelling agent strands, and the connections between the strands, creates a flexible, elastic matrix with water filling the spaces between and around the strands. The other ingredients in the confection may also be positioned between and around the strands. The elastic texture of the confection dictates the chewing texture and how long the confection mass remains in one piece during chewing. By elastic texture it is meant that the confection has some give and stretch before breaking when pressure is applied by teeth during chewing.

Gelling agents are humectants and are water soluble, so the elastic texture of the finished gelled confection is affected by the water content of the confection. Moisture puts distance between the strands, which limits contact between strands and allows movement of the strands. Higher amounts of water may create a softer, less elastic confection texture because of the greater distance between the gelling agent strands and fewer contact points. If the confection's moisture level is low, the confection may be hard because of too many contacts between strands and because of too little room between strands to allow movement without breaking during chewing.

Because the gelling agents are humectants, they may control a certain amount of the water in a gelled confection. If the gelling agent in a gelled confection controls the water in the confection, the water will not migrate (i.e., move) to the confection surface and make a sticky product surface. During storage, water may become "free" (i.e., excess) during storage when the gelling agent strands contract and "squeeze" water out of the gelling agent matrix. During storage, the gelling agent may pick up water from the environment. If enough moisture is absorbed during storage, a freshly produced firm gelled confection may deform and flow over time (i.e., cold flow), that is the confection piece may flatten and spread due to the matrix weakening as connections are lost between strands due to excess water in the matrix. On the other hand, if during storage a gelled confection loses moisture to the environment, such as by evaporation, the originally flexible elastic gelled confection may become firm and tough as the strands are brought into closer contact with each other.

To be commercially acceptable, the gelled confection needs to have a non-sticky surface and stable shape, both right after processing and after storage at a reasonable temperature and relative humidity. That is, the gelled confection of this invention may be at least as stable to temperature and relative humidity as traditional confections made with corn syrup and sucrose at a 55:45 wt. % solids ratio.

Ingredients in the confection mass, other than gelling agent, can also affect the texture of a gelled confection. For example, gelled confections contain at least one bulking sweetener agent and at least one doctoring agent. Both bulking sweetener agents and doctoring agents supply volume and weight to gelled confections. Bulking sweetener agents also supply the primary dissolvable mass in the confection, which creates a syrup-like solution in the mouth during chewing. Doctoring agents may also supply a dissolvable mass, which also creates a syrup-like solution in the mouth. This syrup-like solution is what carries any additional water soluble ingredients, such as flavors and sensates, to the tongue. Both the bulking sweetener agents and doctoring agents must be chosen such that they will not mask the perception of flavors and sensates.

The gelled confection may contain some bulking sweetener agent in crystalline form. The amount in crystalline form may be limited in gelled confections, as the crystals may interfere with confection elastic texture, may create a grainy mouthfeel, and may negatively affect clarity. Bulking sweetener agent in crystalline form also affects the solubility of the full gelled confection, which may also affect the delivery of flavors and sensates to the mouth.

Typically, the bulking sweetener agent is combined with water and the doctoring agent to create a saturated solution, which is then mixed with a suspension of gelling agent in water. After the combination is cooked (i.e., heated), the agent sets up a matrix throughout the confection as the confection mass cools. Final confection mass moisture level may be further reduced to create less distance between gelling agent strands, while maintaining enough moisture to allow flexibility of the matrix. Methods for further reducing moisture include, but are not limited to, baking, extruding, starch molding, and combinations thereof. Baking is a process wherein the confection mass is poured into molds, which are then held in a heated chamber until the desired amount of water has evaporated. The pieces are then removed from the molds. Extruding is a process wherein the confection mass is poured into or made in an apparatus (i.e., extruder) which can then pull water from the confection mass through heat application and evaporation. The extruded candy mass is then cut into pieces when it leaves the extruder. Starch molding is a process wherein the confection mass is poured into shapes pressed into a cake of starch. The starch pulls water from the confection mass during storage under controlled temperature and humidity conditions. When the confections are at the appropriate moisture content, they are removed from the starch cake.

As discussed above, the moisture in the confection mass is reduced during processing. Under certain low moisture conditions, the bulking sweetener agent may crystallize in the finished confection, creating defects in texture, clarity, and dissolving rate. One role of a doctoring agent is to interfere with the bulking sweetener agent's tendency to form crystals as the moisture level in the confection mass decreases, without causing different texture defects, such as softening and cold flow.

Doctoring agents influence gelled confection stability during cooking and storage by controlling the water present in the confection. The water may be present due to lack of evaporation (i.e., removal) during cooking, baking, extruding or starch molding or due to water absorption during storage. Excess water in a gelled confection that is not controlled by the gelling agent or the doctoring agent may start to dissolve the gelled confection contents. As a result of this, the gelled confection may deform and flow during storage (i.e., cold flow). The confection surface may also become sticky as uncontrolled water dissolves bulking sweetener agent on the outer surface of the confection. The gelled confection texture could change from a consumer acceptable firm, elastic texture, to a too soft and non-elastic texture.

Doctoring agents additionally influence gelled confection stability during storage by keeping moisture in the gelled confection during storage at low humidity conditions. As discussed above, reduction of moisture in a gelled confection could negatively change confection texture from elastic to inelastic, and possibly even to hard or brittle. Doctoring agents are humectants, so they attract and hold water. This means that doctoring agents can control the water left in a formula by processing. Also doctoring agents can cause confections to absorb water from the atmosphere.

A stable gelled confection exists when there is a balance between bulking sweetener agents and doctoring agents. High levels of doctoring agent may prevent the crystallization of bulking sweetener agent by interfering with bulking sweetener agent crystal formation. Too high a level of doctoring agent may cause its own defects by creating a too soft and/or sticky texture due to the doctoring agent interfering with gelling strand contacting and/or by the doctoring agent absorbing too much water from the environment. Accordingly, it is necessary to find a balance of ingredients that delivers an optimal gelled confection.

A traditional gelled confection has a balance of bulking sweetener agent and doctoring agent to obtain the optimal consumer accepted gelled confection. Sucrose is the traditional bulking sweetener agent for gelled confections, with corn syrup being the traditional doctoring agent partnered with it. Corn syrup, with its long and short carbohydrate chains, can physically interfere with sucrose crystallization and can absorb water in the gelled confection. Corn syrup at 55 wt. % solids and sucrose at 45 wt. % solids are a stable balance of doctoring agent and bulking sweetener agent that make a gelled confection with consumer acceptable texture, clarity, stability, and flavor delivery.

A current consumer concern with sucrose based gelled confections is cariogenicity. Most sugars (including sucrose, maltose, fructose, and dextrose) are cariogenic. In general, cariogenic ingredients create dental caries. Dental caries is an infectious disease that damages the structure of teeth. Non-cariogenicity or "tooth friendliness" of a substance such as a saccharide or a saccharide derivative may be determined by means of intraoral pH telemetry such as used by Tooth Friendly International, a non-profit organization. In a standard procedure, plaque pH is measured in at least four persons during and for 30 minutes after consumption of a substance to be tested with a plaque-covered electrode. Products which do not lower plaque pH below 5.7, under the test conditions, are considered to lack cariogenic potential.

Efforts have been made to improve the healthiness of gelled confections. For the most part, consumers would prefer that a gelled confection is non-cariogenic due to the dental benefits. With the goal of reducing cariogenicity, gelled confections have been made with reduced sugar content. One way of reducing sugar content, is to shift the proportion of corn syrup to sucrose in a gelled confection formula, so that the gelled confection would contain less sucrose. This option has limited usefulness towards reducing gelled confection cariogenicity because corn syrup also contains various sugars. Also, there may be a necessary balance in the amount of doctoring agent to bulking sweetener agent in order to have a gelled confection that has a consumer acceptable texture, flavor delivery, and stability to cold flow and stickiness formation. Traditional corn syrup and sucrose gelled confections have a ratio of corn syrup to sucrose of 55:45 wt. % solids. More corn syrup will reduce sucrose crystallization due to interference with gelling agent strands. Furthermore, more corn syrup may also make a softer textured, less elastic gelled confection with more tendency to cold flow and develop surface stickiness because of water absorbed by the corn syrup.

Sorbitol, maltitol, and isomalt are polyols that have been used in an attempt to make healthier gelled confections that are less cariogenic than traditional gelled confections made with corn syrup and sucrose at a 55:45 wt. % solids. As these bulk sweetener agents are hygroscopic and are quick to crystallize from a concentrated solution state, a doctoring agent needs to be combined with them to make commercially acceptable textured gelled confections that are at least as stable to cold flow and stickiness formation as gelled confections made with corn syrup and sucrose at a 55:45 wt. % solids. A common doctoring agent is hydrogenated starch hydrolysate (HSH), which is a sugar-free syrup containing polyols of various sizes, mostly sorbitol and/or maltitol. A hydrogenated starch hydrolysate with 50 wt. % or higher maltitol is called maltitol syrup. As with corn syrup combined with sucrose, HSH can interfere with sorbitol, maltitol, and isomalt crystallization and absorb free water in the gelled confection. These polyol bulking sweetener agents and doctoring agents are non-cariogenic and are less caloric than corn syrup combined with sucrose, but they may cause gastrointestinal disturbance (e.g., laxation).

A disadvantage of many polyols is the possibility of causing gastrointestinal disturbances (such as "laxation") upon consumption. Typically, a material is considered not to cause gastrointestinal disturbance (e.g., non-laxative), if such material is either substantially absorbed before entering the large intestine or passes though the large intestine substantially unchanged, in the quantities present in the product consumed. The amount of gastrointestinal disturbance or laxation distress experienced by a consumer of a gelled confection typically depends on the sensitivity of the consumer, the specific polyol used in the gelled confection, and the amount of gelled confection consumed.

Another disadvantage of using sorbitol, maltitol, and isomalt ingredients in gelled confections is that these polyols are not considered natural in many countries, while sugar may be considered a natural ingredient.

Therefore there is a need for a gelled confection, using doctoring agents and bulking sweetener agents, that gives acceptable texture, stability, clarity, and flavor delivery, while being less cariogenic than traditional corn syrup and sucrose gelled confections (at a 55:45 wt. % solids) but at the same time not causing gastrointestinal disturbances. Consumers do not want to sacrifice flavor delivery and texture for less cariogenicity. Manufactures cannot afford to make and sell confections with a shorter shelf life than that of current traditional corn syrup and sucrose gelled confections.

SUMMARY OF THE INVENTION

The present invention relates to an improved gelled confection, more specifically, the present invention relates to an improved gelled confection using bulking sweetener agents and doctoring agents that give acceptable texture, stability, clarity, and flavor delivery, while being less cariogenic than traditional corn syrup and sucrose gelled confections, and while not causing gastrointestinal disturbances.

A low sugar, low cariogenic, low-laxation gelled confection having acceptable texture, stability, clarity, and flavor delivery, that contains a doctoring agent comprising sucromalt, inulin, brown rice syrup, or combinations thereof; erythritol as the bulking sweetener agent; and a gelling agent comprising gelatin, pectin, starch, dextrin, hydrocolloids, milk based proteins, or combinations thereof; wherein the doctoring agent to erythritol ratio is 90:10 to 70:30 wt. % solids and the gelled confection has consumer acceptable texture, stability, clarity, and flavor delivery.

DETAILED DESCRIPTION OF THE INVENTION

The present invention relates to improved formulations for gelled confections containing doctoring agent to bulking sweetener agent ratio of 95:5 to 65:35 wt. % solids, preferably ratio of 90:10 to 70:30 wt. % solids, and containing not more than 50 wt. % solids sugar, preferably not more than 20 wt. % solids sugar. Preferably, the bulking sweetener agent is erythritol, and the doctoring agent comprises sucromalt, inulin (branched or linear), brown rice syrup, or combinations thereof. The gelled confections of the present invention are elastic and dissolve during chewing to create an acceptable sweet syrup.

The bulking sweetener agent, erythritol, and doctoring agents cook in combination with one another to deliver an improved gelled confection. A bulking sweetener agent (i.e., erythritol) is included in the gelled confection of this invention for bulk and for syrup formation as the gelled confection is dissolved during chewing. Unless controlled, the bulking sweetener agent of this invention, erythritol, has a tendency to quickly crystallize, which would tend to make an unacceptable gelled confection due to the confection's lack of elastic texture, firmness, cohesiveness, and poor flavor and sweetness delivery. The erythritol crystals may also create a gritty or grainy texture and a cloudy appearance. Accordingly, doctoring agents are included in the gelled confection of this invention to control or prevent the bulking sweetener agent from crystallizing, while not preventing the gelled confection from firming as the gelling agent sets-up its matrix. The doctoring agents included in the gelled confection of this invention may also be added to absorb free moisture in the gelled confection, so that the gelled confection has the consumer acceptable elastic texture, and so that the gelled confection has a cold flow and stickiness formation stability of at least that of traditional corn syrup:sucrose gelled confection of a 55:45 wt. % solids ratio.

Gelled confections contain at least one gelling agent for the purpose of creating a matrix through the confection that will give the gelled confection an elastic texture when chewed. The gelling agent may also absorb and control some water within the confection. Typical gelling agents include, but are not limited to, gelatin, pectin, starch, dextrin, hydrocolloids, milk proteins, and combinations thereof.

Besides the bulk sweetener agent, doctoring agent, and gelling agent, other ingredients are commonly added to gelled confections including, but not limited to, flavors, acids, sensates, cooling agents, active ingredients (e.g., drugs), and colors. High intensity sweeteners (HIS) can be added to increase the gelled confection sweetness level, in particular when the bulking sweetener agent is less sweet than sucrose. High intensity sweeteners include, but are not limited to, aspartame, acesulfame-K, steviol glycosides, rebaudioside-A, Luo Han Guo, sucralose, stevia, saccharine, or combinations thereof.

In one embodiment of the invention, a gelled confection contains a gelling agent selected from, but not limited to, gelatin, pectin, starch, dextrins, hydrocolloids, milk based proteins, and combinations thereof; a bulking sweetener agent that is erythritol; and a doctoring agent selected from the group sucromalt, inulin (linear or branched), brown rice syrup, or combinations thereof; and the ratio of doctoring agent to erythritol bulking sweetener agent is 95:5 to 65:35 wt. % solids, preferably 90:10 to 70:30 wt. % solids.

The bulking sweetener agent, erythritol, is a polyol with unusual characteristics for a polyol. The first two are recognized benefits: erythritol is non-cariogenic and natural. Two other unusual characteristics of erythritol are not normally considered benefits to confection production: low solubility and high rate of crystallization. Surprisingly, these last two characteristics need not prevent erythritol from being used to make consumer acceptable gelled confections. Erythritol is a four-carbon sugar alcohol. Erythritol is produced from glucose by fermentation with the yeast, *Moniliella pollinis*. Erythritol is absorbed into the bloodstream in the small intestine. Because erythritol is absorbed before it enters the large intestine, it does not normally cause the laxative effects that are often experienced with consumption of other polyols, such as sorbitol, maltitol, and isomalt. Erythritol cannot be metabolized by oral bacteria, so it does not contribute to tooth decay. Erythritol is available from Cargill, Inc. Erythritol may be used to make gelled confections that are non-cariogenic and non-laxative. A challenge with erythritol is that its low water solubility limits initial syrup concentration. Another challenge with erythritol is that it crystallizes very quickly from a concentrated or supersaturated syrup. Because of these challenges erythritol needs a suitable doctoring agent at a suitable proportion to control the crystallization so that an elastic gelled confection can be produced that will be storage stable and give consumer acceptable clarity, texture and flavor delivery. When erythritol crystallizes uncontrolled in gelled confections, the crystals can interfere with the gelling agent matrix and the texture will become firm, hard, or even brittle. Also, uncontrolled crystallization can create crystals large enough to interfere with the translucency (i.e., clarity) of the finished product and large enough that they can be felt on the tongue as grit or grain. All of these characteristics are considered defects in traditional gelled confections, hence additional ingredients (i.e., doctoring agents) are necessary to deliver the acceptable gelled confection containing erythritol.

According to the Food and Drug Administration, the term "natural" may be applied only to ingredients that are not chemically processed and are not more than minimally processed. Certain bulking sweetener agents and doctoring agents may be labeled as "natural" and may be used in confections, which could then be labeled as "natural". Currently, those processes commonly used to make sorbitol, maltitol, and isomalt are such that these ingredients may not be labeled natural. Erythritol is made by an enzymatic method that allows it to be labeled as "natural". Sucromalt, inulin (linear and branched), and brown rice syrup are doctoring agents that can be labeled as "natural".

Doctoring agents that may be added to gelled confections containing erythritol, which are non-cariogenic or low cariogenic, include sucromalt, inulin (linear or branched), brown rice syrup, or combinations thereof. Corn syrup is cariogenic due to its sugar content.

Inulin is a group of oligosaccharides occurring naturally in many plants and belongs to a class of carbohydrates called fructans. Inulin is a prebiotic fermentable fiber and is metabolized by gut flora yields short chain fatty acids, which are reported to increase absorption of calcium, magnesium, and iron. Inulin also promotes an increase in the mass and health of intestinal *Lactobacillus* and *Bifidobacterium* populations. Inulin is composed of linear chains of fructose units linked by β (2→1) bonds and is often terminated by a glucose unit. Inulin sources contain polymers in a distribution of chain lengths, which are described by their DP (number of sugar units). Typically, inulin is a material in a long linear chain form. A branched inulin (also called phlein), such as BioAgave™, supplied by GTC Nutrition, is a long chain inulin that has a high degree of polymerization. Inulin has a minimal impact on blood sugar and does not raise blood triglycerides, making it generally considered suitable for diabetics. The branched inulin material used in the samples recorded in this document contained glucose, sucrose, and fructose (10 wt. % solids), and branched fructan (90 wt. % solids). Branched inulin has the benefits of linear inulin discussed above, though its branched structure allows it to perform differently than linear inulin in gelled confections. For example, branched inulin works better as a doctoring agent than linear inulin due to the branched structure being more flexible than that of linear inulin. Also, branched inulin, because of its structure, can control more water than linear inulin. The branched inulin appears to be more compatible with gelling agents (e.g., gelatin), than linear inulin.

Sucromalt is a material that can be used as a doctoring agent to make an acceptable gelled confection of this invention. Sucromalt (available under the trade name of XTEND® sucromalt from Cargill) is a mixture of carbohydrates produced by reacting sucrose and maltose utilizing an enzyme alternansucrase. Sucromalt is a mixture of fructose, leucrose, and oligosaccharides containing α-(1-3), α-(1-4) and α-(1-6) glycosidic linkages with a degree of polymerization less than 12. The final product contains fructose (35-45 wt. % solids), leucrose (7-15 wt. % solids), saccharides with low degrees of polymerization (<5 wt. % solids), higher saccharides and polymer (>40 wt. % solids), and moisture (<30 wt. % solids). Sucromalt does not cause gastrointestinal distress. Sucromalt used in this document contained fructose (37 wt. % solids), leucrose (13 wt. % solids), other DP2 saccharides (2 wt. % solids), and higher saccharides (48 wt. % solids).

Brown rice syrup (supplied by Malt product Corporation) is produced by combining crushed brown rice, water, and food grade enzymes (all natural ingredients). When the rice starch has been hydrolyzed to the appropriate level, the mass is evaporated. The brown rice syrup used in this document contained dextrose (19 wt. % solids), maltose (14 wt. % solids), trisaccharide (12 wt. % solids), and higher saccharides (55 wt. % solids).

Various embodiments of the present invention are considered within the scope of the invention resulting in the use of combinations of doctoring agents and bulking agents as disclosed previously.

In an embodiment of the invention, a gelled confection contains doctoring agent to erythritol ratio of 95:5 to 65:35 wt. % solids, preferably ratio of 90:10 to 70:30 wt. % solids, contains not more than 50 wt. % solids sugar, preferably not more than 20 wt. % solids sugar, and contains doctoring agent comprising of sucromalt, inulin (linear or branched), brown rice syrup, or combinations thereof.

In another embodiment of the invention, a gelled confection contains at least 70 wt. % solids, but not more than 95 wt. % solids, wherein the solids contain doctoring agent to bulking sweetener agent in the ratio of 95:5 to 65:35 wt. % solids, preferably in the ratio of 90:10 to 70:30 wt. % solids, and the doctoring agent is sucromalt, inulin (linear or branched), brown rice syrup, or combinations thereof, the bulking sweetener agent is erythritol, and the gelling agent is selected from a group that includes, but is not limited to, gelatin, pectin, starch, dextrin, hydrocolloids, milk proteins, and combinations thereof.

In another embodiment of the invention, a gelled confection contains at least 70 wt. % solids, but not more than 95 wt. % solids, wherein the solids contain doctoring agent to bulking sweetener agent in the ratio of 95:5 to 65:35 wt. % solids, preferably in the ratio of 90:10 to 70:30 wt. % solids, and the doctoring agent is sucromalt and/or branched inulin, the bulking sweetener agent is erythritol, and the gelling agent includes gelatin, starch, dextrin, or combination thereof.

In another embodiment of the invention, a gelled confection contains erythritol, less than 50 wt. % solids sucrose, preferably less than 20 wt. % solids sucrose, and sucromalt and/or branched inulin, does not cause intestinal disturbance, and is at least as stable to cold flow and stickiness formation as gelled confections containing corn syrup and sucrose in a 55:45 wt. % solids ratio.

In another embodiment of the invention, a gelled confection with less cariogenicity then gelled confection containing corn syrup and sucrose in a ratio of 55:45 wt. % solids, may be produced by combining erythritol with doctoring agent containing sucromalt, branched inulin, brown rice syrup or combinations thereof, and gelling agent from a group including, but not limited to, gelatin, pectin, starch, dextrin, hydrocolloids, milk proteins, and combinations thereof.

EXAMPLES AND COMPARATIVE RUNS

The following comparative runs and examples of the invention are provided to illustrate, but not limit, the invention that is defined by the attached claims.

Effect of Replacing Sucrose with Erythritol.

TABLE 1

Formulas for Gelled Confections Containing Sucrose or Erythritol with Corn Syrup Doctoring Agent: Samples A (control), B, C, D, E, F.

|  | Control: 63 DE Corn Syrup/ Sucrose = 55/45 A | 63 DE Corn Syrup/ Erythritol = 55/45 B | 63 DE Corn Syrup/ Erythritol = 55/45 C | 63 DE Corn Syrup/ Erythritol = 90/10 D | 63 DE Corn Syrup/ Erythritol = 80/20 E | 63 DE Corn Syrup/ Erythritol = 70/30 F |
|---|---|---|---|---|---|---|
| 63 DE Corn Syrup | 50.06 | 50.06 | 50.06 | 81.14 | 72.25 | 63.29 |
| Sucrose | 40.91 | 0 | 0 | 0 | 0 | 0 |
| Erythritol | 0 | 40.91 | 40.91 | 9.09 | 18.17 | 27.32 |
| Water | 0 | 0 | 0 | 0 | 0 | 0 |
| Gelatin 250 | 7.69 | 7.69 | 7.69 | 8.22 | 8.07 | 7.91 |
| Citric Acid 50% Soln. | 1.34 | 1.34 | 1.34 | 1.43 | 1.4 | 1.37 |
| High Intensity Sweetener | 0 | 0 | 0.11 | 0.12 | 0.12 | 0.11 |

All samples cooked to 86 Brix.

Samples were made by a) creating a saturated solution containing water, bulking sweetener agent and doctoring agent; b) creating a hydrated suspension containing water and gelling agent; c) combining the saturated solution with the hydrated suspension; d) removing water from the combination by cooking (i.e., heating); e) cooling the confection to thicken it; f) finishing the confection by pouring cooling mass into starch molds; and g) removing confection pieces from starch molds.

TABLE 2

Sensory Results of Gelled Confections of Table 1: Samples A (control), B, C, D, E, F.

|  | Control: 63 DE Corn Syrup/ Sucrose = 55/45 A | 63 DE Corn Syrup/ Erythritol = 55/45 B | 63 DE Corn Syrup/ Erythritol = 55/45 C | 63 DE Corn Syrup/ Erythritol = 90/10 D | 63 DE Corn Syrup/ Erythritol = 80/20 E | 63 DE Corn Syrup/ Erythritol = 70/30 F |
|---|---|---|---|---|---|---|
| Texture/Firmness | 5.33 | 6.33 | 7.11 | 6.33 | 5.89 | 5.44 |
| Texture/Chewiness | 6.11 | 3.22 | 4.11 | 6.56 | 5.00 | 4.56 |
| Sweetness | 4.89 | 4.11 | 5.33 | 4.44 | 5.00 | 5.22 |
| Flavor Strength | 4.67 | 3.78 | 4.67 | 3.89 | 4.67 | 4.89 |

Testers evaluated each sample blind, in random order, against a nine point scale (1-9: not at all to extremely). Scores were averaged.

TABLE 3

Texture Spring Back Test Results for Gelled Confections of Table 1: Samples A (control), B, C, D, E.

|  | Control: 63 DE Corn Syrup/Sucrose = 55/45 A | 63 DE Corn Syrup/Erythritol = 55/45 B | 63 DE Corn Syrup/Erythritol = 55/45 C | 63 DE Corn Syrup/Erythritol = 90/10 D | 63 DE Corn Syrup/Erythritol = 80/20 E |
|---|---|---|---|---|---|
| Spring Back Test | 68.6 | 39.2 | 34.5 | 48.9 | 75.0 |

(Sample F not tested.)

The Spring Back Test measures the "spring back", which is a measure of how the sample "stores" energy from the stress of compression. High values indicate most of the compression energy is stored (similar to a traditional metal spring). Low values indicate a lot of energy is lost. The higher the spring back number, the greater the confection returned to its original shape after compression. That is, the higher the spring back number, the more elastic the confection. The test was done using a Texture Analyzer (TA.XT plus), 50 kg and 5 kg load cells, and Texture Technologies TA-19 Kobe cylinder probe.

The control sample (A) gelled confection contained a corn syrup to sucrose ratio of 55/45 wt. % solids. This is a traditional ratio of corn syrup doctoring agent to sucrose bulking sweetener agent, selected because of its consumer acceptable flavor release, texture, and stability. A one-for-one replacement of sucrose with erythritol was produced in sample (B) gelled confection, resulting in the new gelled confection being much firmer, much less chewy, less sweet, and less flavor than the control 55:45 corn syrup:sucrose sample (A). A one-for-one replacement of sucrose with erythritol was produced in sample (C) gelled confection, with the addition of high intensity sweetener. Addition of the high intensity sweetener improved the sweetness and flavor strength scores. The erythritol visibly crystallized within this sample creating a cloudy appearance. As previously discussed, consumers prefer non-cloudy, translucent gelled confections.

Surprisingly, the ratio of doctoring agent (i.e., corn syrup) to erythritol that made a gelled confection most similar to the control, in terms of firmness, chewiness, sweetness, and flavor delivery, fell between (and including) the ratios of 90:10 to 70:30 doctoring agent to erythritol wt. % solids (samples D, E, & F). It is not clear why less erythritol then sucrose was needed to make similar gelled confections using the same doctoring agent. Traditionally, more sucrose (i.e., bulking sweetener agent) in the formula would create a firmer and less chewy gelled confection, whereas more corn syrup (i.e., doctoring agent) in the formula would create a softer, less elastic, and stickier confection.

Table 3 texture results further confirm that the control sample (A) gelled confection with 55:45 corn syrup:sucrose wt. % solids and the samples (B) and (C) gelled confection with 55:45 corn syrup:erythritol wt. % solids have very different spring back test results. In contrast, sample (D) gelled confection with 90:10 corn syrup:erythritol wt. % solids and the sample (E) gelled confection with 80:20 corn syrup:erythritol wt. % solids samples are more similar to that of the control sample. The higher the spring back test number, the more elastic the confection.

Though the removal of sucrose from the gelled confection formula reduced the cariogenicity of the confection, these erythritol containing confection samples still contained sugar due to the sugar in the corn syrup doctoring agent.

Effect of Replacing Corn Syrup Doctoring Agent with Brown Rice Syrup

A replacement for corn syrup may be brown rice syrup. Brown rice syrup is considered "natural" because of its raw materials and manufacturing process are considered "natural". Corn syrup cannot be labeled as "natural" because it is produced by a chemical process.

TABLE 4

Formulas for Gelled Confections Containing Corn Syrup: Sucrose versus Brown Rice Syrup: Erythritol versus Brown Rice Syrup: Branched Inulin: Erythritol: Samples G (control), H, I.

|  | Control: 63 DE Corn Syrup/Sucrose G | Brown Rice Syrup/ Erythritol H | Brown Rice Syrup/ Branched Inulin/ Erythritol I |
|---|---|---|---|
| Sucrose | 40.91 | 0 | 0 |
| 63DE Corn Syrup | 50.06 | 0 | 0 |
| 42DE Brown Rice Syrup | 0 | 72.2 | 59.94 |
| Branched Inulin | 0 | 0 | 11.78 |
| Erythritol | 0 | 17.9 | 18.16 |
| Gelatin 250 | 7.69 | 8.40 | 8.62 |
| Citric Acid | 1.34 | 1.40 | 1.40 |
| High Intensity Sweetener | 0 | .09 | .07 |

Samples were made by a) creating a saturated solution containing water, bulking agent, and doctoring agent; b) creating a hydrated suspension containing water and gelling agent; c) combining the saturated solution with the hydrated suspension; d) removing water from the combination by cooking (i.e., heating); e) cooling the confection to thicken it; f) finishing the confection by pouring cooling mass into starch molds; and g) removing confection pieces from starch molds.

TABLE 5

Consumer Test Results of Gelled Confections of Table 4: Samples G (control), H, I.

|  | Control: 63 DE Corn Syrup/ Sucrose G | Brown Rice Syrup/ Erythritol H | Brown Rice Syrup/ Branched Inulin/ Erythritol I |
|---|---|---|---|
| Overall Liking | 7.41 [I] | 7.63 [gI] | 7.07 |
| Flavor Strength | 5.14 | 6.32 [GI] | 5.81 [G] |
| Flavor Liking | 7.17 [c] | 7.50 [gI] | 6.93 |
| Texture/Firmness | 4.45 | 6.08 [G] | 6.63 [GH] |
| Texture Liking | 6.88 [c] | 7.20 [gI] | 6.65 |
| Sweetness | 5.17 | 6.07 [GI] | 5.58 [G] |
| Sweetness Liking | 7.06 [c] | 7.26 [gI] | 6.82 |

Samples were tested blind and in random order. 88 (n=88) Consumer testers evaluated overall liking on a 9 point scale (1-9: dislike it extremely to like it extremely); flavor strength, texture, and sweetness on a 9 point scale (1-9: not at all to extremely); liking flavor strength, texture, and sweetness on a 9 point scale (1-9; dislike it extremely to like it extremely). Upper case letters indicate a significant difference at the 95% confidence level—defined in this document as "significantly different." Lower case letters indicate a significant difference at the 80% confidence level—defined in this document as "directionally different." One tail tests.

Table 5 shows that the control sample (G) gelled confection contained corn syrup to sucrose in a ratio of 55:45 wt. % solids. The sample (H) gelled confection contained brown rice syrup to erythritol in a ratio of 80:20 wt. % solids. The sample (I) gelled confection contained brown rice syrup to branched inulin to erythritol in a ratio of 67:13:20 wt. % solids. The results of Table 5 indicate that sample (H) (brown rice syrup/erythritol) was significantly preferred in overall liking over sample (I) (brown rice syrup/branched inulin/erythritol) and directionally preferred over the control sample (G) (corn syrup/sucrose). On a scale of 1-9, all of the products were at least 7. The results in Table 5 show that the preference for sample (H) gelled confection was based on more sweetness and sweetness liking, more texture firmness and texture firmness liking, and more flavor strength and flavor strength liking over the control sample (G).

Substituting some of the brown rice syrup doctoring agent with branched inulin, created sample (I) gelled confection that was significantly different from the control sample in flavor strength, texture firmness, and sweetness, but not significantly different from control sample in liking of flavor strength, texture firmness, or sweetness. The substitution of branched inulin reduced the sugar content in the gelled confection, which affected the amount of sweetness and flavor, but did not affect liking of the resulting amount of sweetness and flavor. The texture firmness of sample (I) gelled confection was the firmest of these three samples, as the branched inulin gave the gelled confection more structure, which made that sample (I) a directionally less liked texture from the control sample and a significantly less liked texture from the sample (G).

Effect of Replacing Corn Syrup Doctoring Agent with Sucromalt

Another "natural" replacement for corn syrup may be sucromalt. Sucromalt is a sweetener syrup produced by an enzymatic process that may be considered "natural" in several countries, including the United States.

TABLE 6

Formulas for Gelled Confections Containing Corn Syrup: Sucrose versus Sucromalt: Erythritol versus Branched Inulin: Erythritol: Samples J (control), K, L.

|  | Control: 63 DE Corn Syrup/ Sucrose J | Sucromalt/ Erythritol K | Branched Inulin/Erythritol L |
|---|---|---|---|
| Sucrose | 40.91 | 0 | 0 |
| 63DE Corn Syrup | 50.06 | 0 | 0 |
| Sucromalt | 0 | 71.62 | 0 |
| Branched Inulin | 0 | 0 | 69.64 |
| Erythritol | 0 | 18.2 | 19.47 |
| Gelatin 250 | 7.69 | 8.67 | 9.27 |
| Citric Acid | 1.34 | 1.44 | 1.54 |
| High Intensity Sweetener | 0 | .07 | .08 |

Samples were made by a) creating a saturated solution containing water, bulking sweetener agent, and doctoring agent; b) creating a hydrated suspension containing water and gelling agent; c) combining the sweetener solution with the hydrated suspension; d) removing water from the combination by cooking (i.e., heating); e) cooling the confection to thicken it; f) finishing the confection by pouring cooling mass into starch molds; and g) removing confection pieces from starch molds.

TABLE 7

Consumer Test Results of Gelled Confections of Table 6: Samples J (control), K, and L.

|  | Control: 63DE Corn Syrup/Sucrose J | Sucromalt/ Erythritol K | Branched Inulin/ Erythritol L |
|---|---|---|---|
| Overall Liking | 7.59 [L] | 7.75 [L] | 6.81 |
| Flavor Strength | 5.21[L] | 6.17 [JL] | 4.59 |
| Flavor Liking | 7.38 [L] | 7.70 [jL] | 6.62 |
| Texture/Firmness | 4.17 | 5.73 [J] | 6.14 [Jk] |
| Texture Liking | 6.94 [L] | 7.43 [JL] | 6.10 |
| Sweetness | 5.42 [L] | 6.11 [JL] | 4.81 |
| Sweetness Liking | 7.16 [L] | 7.57 [jL] | 6.47 |

Samples were tested blind and in random order. 88 (n=88) Consumer testers evaluated overall liking on a 9 point scale (1-9: dislike it extremely to like it extremely); flavor strength, texture, and sweetness on a 9 point scale (1-9: not at all to extremely); liking flavor strength, texture, and sweetness on a 9 point scale (1-9; dislike it extremely to like it extremely). Upper case letters indicate a significant difference at the 95% confidence level—defined in this document as "significantly different." Lower case letters indicate a significant difference at the 80% confidence level—defined in this document as "directionally different." One tail tests.

Table 7 shows that the control sample (J) gelled confection contained corn syrup to sucrose in a ratio of 55:45 wt. % solids. The sample (K) gelled confection contained sucromalt to erythritol in a ratio of 80:20 wt. % solids. The sample (L) gelled confection contained branched inulin to erythritol in a ratio of 80:20 wt. % solids. The results of Table 7 indicate that sample (K) (sucromalt/erythritol) was overall liked the same as the control sample (J) gelled confection and significantly preferred in overall liking over sample (L) (branched inulin/erythritol). The results in Table 7 show that though there was no preference for sample (K) gelled confection in overall liking over sample (J), there was significant or directional preference for sample (K) as to the flavor strength and flavor strength liking, texture firmness and texture firmness liking, and sweetness and sweetness liking of the sample (K) over that of the control sample (J). Replacing the sucromalt doctoring agent with only branched inulin, created a sample (L) gelled confection that scored lower in all characteristics from that of the control (J) and sample (K), in particular, the texture firmness score was significantly higher than that of the control and directionally higher than that of sample (K), which resulted in texture firmness liking scores significantly less than that of both the control sample (J) and sample (K).

The branched inulin, though it did act as a doctoring agent and created a gelled confection appropriate for consumer sensory testing, it contained too much matrix building character to be a one for one replacement for sucromalt. This is similar to what was discussed with branched inulin and sample (I) gelled confection.

TABLE 8

Formulas for Gelled Confections Containing Corn Syrup: Sucrose versus Sucromalt: Branched Inulin/Erythritol: G (control); M;

|  | Control: 63 DE Corn Syrup/ Sucrose G | Sucromalt/Branched Inulin/Erythritol M |
|---|---|---|
| Sucrose | 40.91 | 0 |
| 63DE Corn Syrup | 50.06 | 0 |
| Sucromalt | 0 | 59.32 |
| Branched Inulin | 0 | 11.96 |
| Erythritol | 0 | 18.44 |
| Gelatin 250 | 7.69 | 8.76 |
| Citric Acid | 1.34 | 1.40 |
| High Intensity Sweetener | 0 | .07 |

Samples were made by a) creating a saturated solution containing water, bulking sweetener agent, and doctoring agent; b) creating a hydrated suspension containing water and gelling agent; c) combining the sweetener solution with the hydrated suspension; d) removing water from the combination by cooking (i.e., heating); e) cooling the confection to thicken it; f) finishing the confection by pouring cooling mass into starch molds; and g) removing confection pieces from starch molds.

TABLE 9

Consumer Test Results of Gelled Confections of Table 8: G (control); M:

|  | Control: 63 DE Corn Syrup/Sucrose G | Sucromalt/Branched Inulin/Erythritol M |
|---|---|---|
| Overall Liking | 7.41 | 7.66 [g] |
| Flavor Strength | 5.14 | 5.78 [G] |
| Flavor Liking | 7.17 | 7.35 |
| Texture/Firmness | 4.45 | 5.88 [G] |
| Texture Liking | 6.88 | 7.39 [G] |
| Sweetness | 5.17 | 5.81 [G] |
| Sweetness Liking | 7.06 | 7.16 |

Samples were tested blind and in random order. 88 (n=88) Consumer testers evaluated overall liking on a 9 point scale (1-9: dislike it extremely to like it extremely); flavor strength, texture, and sweetness on a 9 point scale (1-9: not at all to extremely); liking flavor strength, texture, and sweetness on a 9 point scale (1-9; dislike it extremely to like it extremely). Upper case letters indicate a significant difference at the 95% confidence level—defined in this document as "significantly different." Lower case letters indicate a significant difference at the 80% confidence level—defined in this document as "directionally different." One tail tests.

Table 9 shows that the control sample (G) gelled confection contained corn syrup to sucrose in a ratio of 55:45 wt. % solids. The sample (M) gelled confection contained sucromalt to branched inulin to erythritol in a ratio of 66:13:21 wt. % solids. The results of Table 9 show that sample (M) (sucromalt/branched inulin/erythritol) was directionally preferred in overall liking over control sample (G) gelled confection. The results in Table 9 show that the preference for sample (M) gelled confection was based on sample (M) having significantly more flavor strength, significantly more texture firmness, and significantly more sweetness than the control sample (G). The flavor liking of sample (M) gelled confection was similar to that of the control, though the texture firmness of sample (M) was prefer significantly over that of the control. The sweetness liking of sample (M) was similar to that of the control. Branched inulin was able to be substituted for part of the sucromalt doctoring agent in order to reduce sugar content and carcinogenicity, without negatively effecting the finished gelled confection.

The compositions and methods of the present invention are capable of being incorporated in the form of a variety of embodiments, only a few of which have been illustrated and described above. The invention may be embodied in other forms without departing from its spirit or essential characteristics. The described embodiments are to be considered in all aspects only as illustrative and not restrictive, and the scope of the invention, therefore, is indicated by the claims rather than by the foregoing description. All changes which come within the meaning and range of equivalency of the claims are to be embraced within their scope.

What is claimed is:

1. A gelled confection composition, comprising:
a) erythritol;
b) a doctoring agent, comprising brown rice syrup, sucromalt, or combinations thereof; and
c) a gelling agent comprising gelatin, pectin, starch, dextrin, hydrocolloids, milk based proteins, or combinations thereof;
wherein the doctoring agent to erythritol ratio is 95:5 to 65:35 wt. % solids.

2. The gelled confection composition of claim 1, wherein the gelled confection comprises at least 70 wt. % solids.

3. The gelled confection composition of claim 1, wherein the gelled confection comprises not more than 95 wt. % solids.

4. The gelled confection composition of claim 1, wherein the gelled confection comprises not more than 50 wt. % solids sugar.

5. The gelled confection composition of claim 1, wherein the gelled confection comprises not more than 20 wt. % solids sugar.

6. The gelled confection composition of claim 1, wherein the gelled confection has texture similar to that of a gelled confection comprising corn syrup to sucrose at a ratio of 55:45 wt. % solids.

7. The gelled confection composition of claim 1, wherein the gelled confection further comprises sucrose, at a level less than 25 wt. % solids of the gelled confection composition.

8. The gelled confection composition of claim 1, wherein the doctoring agent is brown rice syrup.

9. The gelled confection composition of claim 1, wherein the doctoring agent is sucromalt.

10. The gelled confection composition of claim 1, wherein the confection contains at least 4 wt. % solids gelling agent selected from the group consisting of gelatin, pectin, starch, dextrin, hydrocolloids, milk based proteins, or combinations thereof.

11. The gelled confection composition of claim 10, wherein the gelling agent is gelatin.

12. The gelled confection composition of claim 10, wherein the gelling agent is pectin.

13. The gelled confection composition of claim 10, wherein the gelling agent is starch.

14. The gelled confection composition of claim 10, wherein the gelling agent is dextrin.

15. The gelled confection composition of claim 10, wherein the gelling agent is hydrocolloids.

16. The gelled confection composition of claim 10, wherein the gelling agent is milk based proteins.

17. A gelled confection composition comprising:
a) at least 10 wt. % solids erythritol;
b) at least 50 wt. % solids sucromalt; and
c) at least 4 wt. % solids gelling agent selected from the group consisting of gelatin, pectin, starch, dextrin, hydrocolloids, milk based proteins, or combinations thereof,
wherein the sucromalt to erythritol ratio is 95:5 to 65:35 wt. % solids.

18. The gelled confection composition of claim 17, further comprising:
a) at least 5 wt. % solids branched inulin.

19. The gelled confection composition of claim 17, further comprising:
a) not more than 50 wt. % solids sugar.

20. The gelled confection composition of claim 17, further comprising:
a) not more than 20 wt. % solids sugar.

21. The gelled confection composition of claim 17, wherein the gelled confection has texture similar to that of a gelled confection comprising corn syrup to sucrose at a ratio of 55:45 wt. % solids.

22. A method of producing a gelled confection comprising the steps:
a) creating a saturated solution containing water, bulking sweetener agent and doctoring agent, wherein the bulking sweetener agent is erythritol and the doctoring agent to bulking sweetener agent ratio is 95:5 to 65:35 wt. % solids;
b) creating a hydrated suspension containing water and gelling agent;
c) combining the saturated solution with the hydrated suspension to make a confection mass;
d) removing water from the confection mass by heating the confection mass;
e) cooling the confection mass to thicken the confection mass;
f) finishing the confection mass by pouring cooling confection mass into starch molds; and
g) removing the confection mass from the starch molds.

23. A gelled confection composition, comprising:
a) erythritol;
b) a doctoring agent, comprising branched inulin and brown rice syrup or branched inulin and sucromalt; and c) a gelling agent comprising gelatin, pectin, starch, dextrin, hydrocolloids, milk based proteins, or combinations thereof;

wherein the doctoring agent to erythritol ratio is 95:5 to 65:35 wt. % solids.

24. The gelled confection composition of claim 23, wherein the doctoring agent comprises inulin (branched) and sucromalt.

25. The gelled confection composition of claim 23, wherein the doctoring agent comprises branched inulin and brown rice syrup.

26. The gelled confection composition of claim 1, wherein the doctoring agent to erythritol ratio is 90:10 to 70:30 wt. % solids.

27. The gelled confection composition of claim 17, wherein the sucromalt to erythritol ratio is 90:10 to 70:30 wt. % solids.

* * * * *